March 30, 1954    H. F. HEISLER    2,673,781
TOOL BOX
Filed Sept. 21, 1949
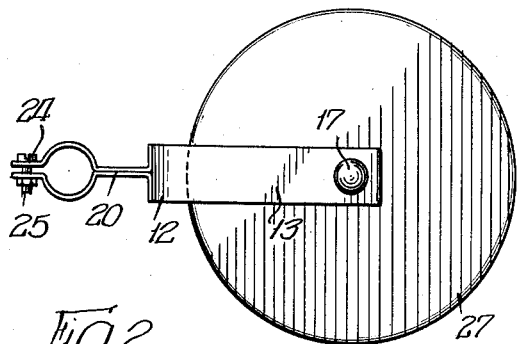
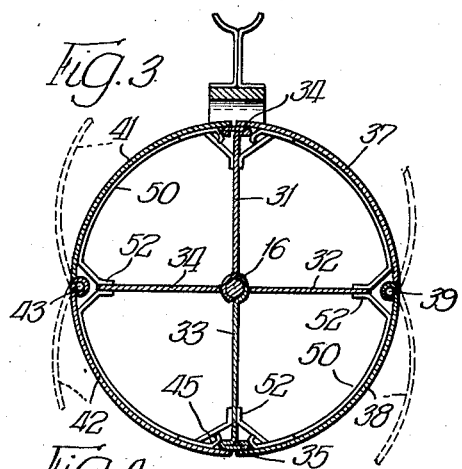
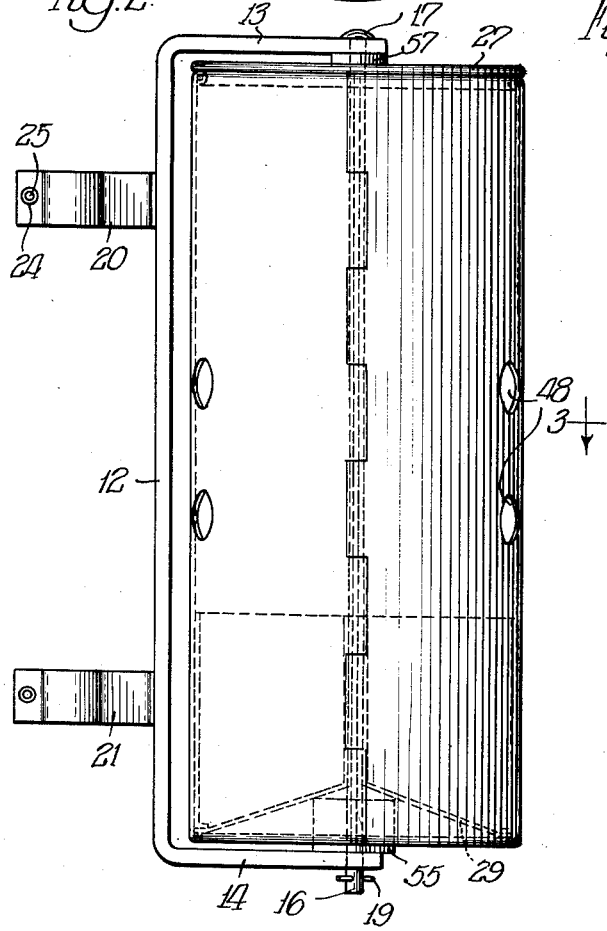
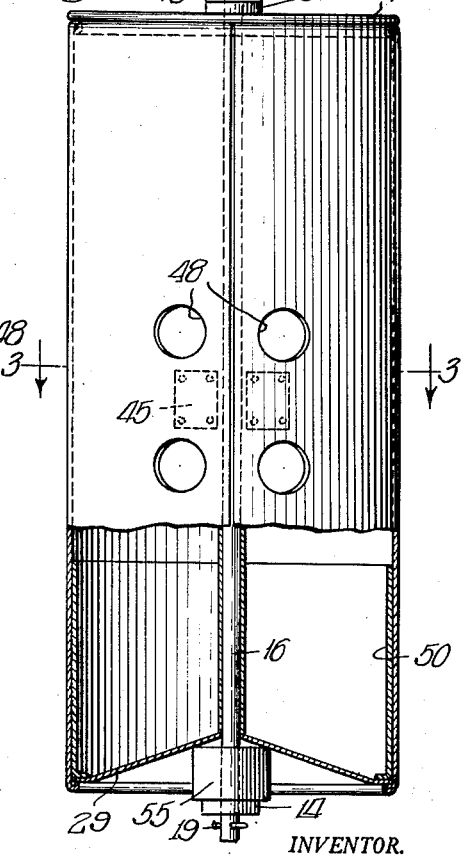
INVENTOR.
Harry F. Heisler,
BY Patented Mar. 30, 1954

2,673,781

UNITED STATES PATENT OFFICE 2,673,781

TOOL BOX

Harry F. Heisler, Waterloo, Iowa, assignor to Heisler Manufacturing Company, Hudson, Iowa, a corporation of Iowa Application September 21, 1949, Serial No. 117,007

1 Claim. (Cl. 312—252)

This invention relates to a new and improved tool box or the like and more particularly to a multiple compartment receptacle especially adapted for attachment to a tractor or other similar vehicle.

In the use of farm tractors or the like, it has proven convenient to provide readily accessible tool holding means. Tools are needed from time to time not only for adjustment or repair of the vehicle or motor but for the attachment, detachment and adjustment of the various types of implements or apparatus drawn by the tractor or operated by power from the tractor.

It is an object of the present invention to provide a tool box and supporting means therefor, the box being provided with a plurality of compartments having separate closure members.

It is a further object to provide a box and mounting so related that the box may be moved upon the mounting to present for access any desired compartment.

It is also an object to provide a box having an internal construction such as to effectively hold tools in position for easy selection and removal for use.

It is another object to provide a tool box which is simple in design and construction and adapted for commercial production and use.

Other and further objects will appear as the description proceeds.

I have shown certain preferred embodiments of my invention in the accompanying drawings, in which—

Figure 1 is a plan view of the tool box and support;

Figure 2 is an elevation of the tool box and support;

Figure 3 is a transverse section taken on line 3—3 of Figure 4; and

Figure 4 is an elevation of the tool box as seen from the right side of Figure 2, with the lower portion broken away to show the internal construction.

In the form of construction shown in the drawings, the yoke 12 is formed of strap metal and has the upper leg 13 and lower leg 14 adapted to support the pivot pin 16 for the tool box, which pin has the head 17 resting upon the upper leg 13. A cotter pin 19 is shown as passed through the end of the pin 16 below the leg 14 of the supporting yoke 12, to retain the pin 16 in position. The supporting straps 20 and 21 are shown as secured to the vertical portion of the yoke 12, the straps being preferably welded to the yoke. As best shown in Figure 1, these straps 20 and 21 are divided in semi-circular shape and provided with the bolts 24 and nuts 25 to clamp the straps to a rod or bar. This form of supporting strap has been found desirable in securing the box in place upon many types of farm tractors, but it will be understood that the details of the securing means may be varied to suit differing supporting structures.

The tool box proper comprises a top member 27 and a bottom member 29, the latter member being dished so that its walls incline upwardly towards the center pivot pin 16, as clearly shown in Figure 4. The dividing members 31, 32, 33 and 34 are all secured to the top and bottom 27 and 29 and have arcuate portions partially encircling the pivot pin 16, as shown in Figure 3. The opposite dividing portions 31 and 33 are provided with the reversely folded outer edges 34 and 35, respectively, which serve as stops for the arcuate cover members 37, 38, 41 and 42. The doors or cover members 37 and 38 are pivoted on the vertical pivot pin 39, while the similar members 41 and 42 are pivoted on the opposite pivot pin 43. These pivot pins 39 and 43 extend from the top member 27 to the bottom member 29 of the box and are secured to those members.

Each of the cover members 37, 38, 41 and 42 is provided with a resilient catch 45 which may be spot-welded to the closure member and has a reversely bent end adapted to spring by the folded edges 34 or 35 of the members 31 and 33 to hold the covers shut. Openings 48 are provided in the various covers and serve in opening the box. These holes 48 are of adequate size so that the fingertips may be passed through them and the covers swung open.

The lower portion of the box is provided with the fixed outer closure members 50, each of which extends for one quadrant and has its ends reversely bent at 52 and secured, as by spot-welding, to the adjacent cross members 31, 32, 33 or 34.

The bearing washer or sleeve 55 is fitted around the central pivot pin 16 and rests on the lower arm 14 of the yoke 12, as best shown in Figure 4. This washer engages the upwardly inclined face of the bottom 29 and maintains the box located so that its lower edge clears the arm 14. A flat spacing washer 57 is shown located between the upper arm 13 and the top 27 of the box.

In the use of the box, it is clamped in the vertical position to some portion of the tractor or other machine with which it is to be used.

The various tools are inserted in the different quadrants by having their lower ends project down into the pockets formed between the cross walls 31, 32, 33 and 34 and the bottom outer fixed walls 50. Due to the downwardly and outwardly inclined bottom surface 29, the lower ends of the tools slide down against the outer wall 50 while gravity will also cause the upper ends of the tools to lie in the right angles formed between the dividing walls. The tools are, therefore, held firmly in position by gravity when the doors are open and have no tendency to fall out. The tools may be divided as desired by the user, particular related tools being put into a single quadrant. The tools may be glimpsed through the finger openings 48 or, if desired, any suitable markings, not shown, may be placed on the various doors either by the manufacturer or the user of the box so that the desired door may be readily identified.

It will be apparent that the improved box will hold a substantial number of tools separated into desired groups and all of them readily available for selection by the user. While a preferred embodiment has been shown, this is to be understood to be illustrative only as the box and supports may be varied to meet different conditions and requirements, and I contemplate such modifications as come within the spirit and scope of the appended claim.

I claim:

In a tool box or the like formed of sheet metal, a central vertically extending pivot pin, box top and bottom members rotatably mounted on the pin, partition members connecting the top and bottom members and extending from the pivot pin to outer edges adjacent the periphery of the top and bottom members to form compartments, the partition members having inner portions closely fitted around the pivot pin to form a continuous bearing thereon, and swinging doors pivoted adjacent certain of said outer edges, outer edges of intermediate partitions being folded over to form flanges on both sides of the partition, the free edges of the swinging doors engaging said flanges to close said compartments.

HARRY F. HEISLER.

References Cited in the file of this patent

UNITED STATES PATENTS

| Number | Name | Date |
| --- | --- | --- |
| 735,614 | Stevens | Aug. 4, 1903 |
| 860,658 | Hawthorne et al. | July 23, 1907 |
| 1,458,000 | Powell | June 5, 1923 |
| 1,822,277 | Everson | Oct. 11, 1932 |
| 1,921,251 | Gerould | Aug. 8, 1933 |
| 1,926,166 | Nahon | Sept. 12, 1933 |
| 1,995,335 | Wilke | Mar. 26, 1935 |
| 2,016,488 | Eckhaus | Oct. 8, 1935 |
| 2,078,581 | Muller | Apr. 27, 1937 |
| 2,078,813 | Sarullo et al. | Apr. 27, 1937 |
| 2,322,199 | Smith et al. | June 15, 1943 |